3,000,786
PROCESS FOR MAKING TETRAHYDRO-SPIRAMYCIN A

Albert Wettstein and Ernst Vischer, Basel, and Hans Bickel, Binningen, Switzerland, assignors to Ciba Pharmaceutical Products Inc., Summit, N.J.
No Drawing. Filed June 2, 1958, Ser. No. 738,935
Claims priority, application Switzerland June 14, 1957
13 Claims. (Cl. 167—65)

This invention provides a new process for the manufacture of tetrahydro-spiramycin A.

Application No. 582,910 filed May 7, 1956 by Ernst Gaeumann et al. describes a process in which a new species of the genus Streptomyces is cultivated to yield four antibiotics, which are named spiramycin A, B, C and D. These substances are present in varying relative proportions in the lipophilic mixture of bases obtained during the isolation. As they are very closely chemically related they can be separated from one another only by complicated methods. Although the individual spiramycins possess almost the same antibiotic and pharmacological properties, it is desirable that a unitary product should be available for therapeutic preparations to enable accurate dosage and reproducible doses to be prepared.

According to Corbaz and another (Helvetica Chimica Acta, vol. 39, page 304 [1956] spiramycin B and spiramycin C are to be regarded, respectively, as the O-acetyl-derivative and the O-propionyl-derivative of spiramycin A. Spiramycin B, C and D cannot be converted into spiramycin A by hydrolysis or reesterification, because the molecules of these substances undergo considerable degradation owing to their instability, so that compounds of low antibiotic activity are obtained.

In the process of the aforesaid specification the spiramycins mentioned above can be hydrogenated to yield tetrahydro-spiramycin A, B, C and D.

The present invention is based on the unexpected observation that tetrahydro-spiramycin A can be obtained in an advantageous manner by hydrolysing tetrahydro-spiramycin B, C or D, or a mixture of two or more of these substances, with at most 1.3 equivalents of a basic agent. Our investigations have shown that tetrahydro-spiramycin A has approximately the same antibiotic activity as mixtures of spiramycins A, B and C or of tetrahydro-spiramycins A, B, C and D.

As starting materials there may be used tetrahydro-spiramycin B, C or D alone or a mixture of two or all of these substances, which may also contain tetrahydro-spiramycin A, and there is used more especially the hydrogenation product of the lipophilic mixture of crude bases obtained by the production of the spiramycins by fermentation. Accordingly, the process of this invention enables such mixtures to be converted in a simple manner into a unitary product.

The reaction may be carried out in an aqueous, organic or advantageously aqueous organic solution. As solvents there may be used, for example, lower alcohols, such as methanol, ethanol or propyl alcohol; lower ketones, such as acetone or methyl ethyl ketone; or dioxane, tetrahydrofurane, glycols and ethers thereof such as methyl-Cellosolve or propylene glycol, pyridine or the like. Especially suitable is a mixture of methanol and water.

Alkaline agents are, for example, hydroxides of alkali metals or alkaline earth metals, such as sodium hydroxide, potassium hydroxide or barium hydroxide, carbonates of alkali metals or alkaline earth metals such as sodium carbonate or potassium carbonate, ammonia and alkyl derivatives thereof, such as methylamine or tetramethyl-ammonium hydroxide, and basic ion-exchange resins in the hydroxyl form.

In the present process there are added at most 1.3 equivalents, and advantageously one equivalent, of the alkaline compound all at once or in portions to a solution of the starting material in one of the aforesaid solvents. The pH-value of the reaction solution during the reaction is advantageously at least 9. The reaction mixture is advantageously allowed to stand with the exclusion of oxygen and light. If the reaction is carried out in a heterogeneous system, for example, in several non-miscible solvents or with an ion-exchanger, it is desirable to carry out the reaction while stirring or shaking. It has been found that heating is not necessary, and that the hydrolysis takes place smoothly and completely at room temperature with most of the aforesaid alkaline agents. The duration of the reaction varies from one hour to two days, depending on the choice of the alkaline agent. If, for example, sodium hydroxide in aqueous-methanolic solution is used for the hydrolysis, the reaction is complete at room temperature in 24 hours. The extent of reaction is advantageously observed continuously by titration or paper chromatography.

The method used for isolating the tetrahydrospiramycin A from the reaction mixture varies depending on the solvent used. If the solvent is of wholly organic nature, it is removed, advantageously in vacuo, and then the tetrahydrospiramycin A which remains behind is purified in the manner described below. When an aqueous or aqueous-organic solvent is used, the reaction mixture, if desired, after distilling off the organic solvent, may be subjected ot extraction at a pH value of at least 7 with an organic water-immiscible solvent. For this purpose there are suitable esters of lower fatty acids, such as ethyl acetate or amyl acetate, chlorinated hydrocarbons, such as ethylene chloride, methylene chloride or chloroform; ketones, such as methyl propyl ketone or diisobutyl ketone; alcohols, such as butyl alcohols or amyl alcohols; ethers, such as ethyl ether, diisopropyl ether or glycol ethers; or aromatic hydrocarbons, such as benzene or toluene, or the like.

Instead of extracting the reaction mixture with a solvent or in conjunction therewith as a further purification step, the tetrahydrospiramycin A may be recovered by adsorption, for example, on active carbon, an activated earth or an acid ion-exchange resin, followed by elutriation of the adsorbate, for example, with an acid aqueous solution and/or with an organic solvent which is at least partially soluble in water, such as isopropanol, butanol or acetone.

A good method for purifying the tetrahydrospiramycin A and for separating by-products consists in distribution between two non-miscible phases, for example, between an 0.2-molar citrate buffer and methylene chloride or chloroform, or between aqueous methanol and a chlorinated hydrocarbon.

A further purification operation is fractional neutralization. In this method the basic reaction products are dissolved in a water-immiscible solvent, and extracted in portions with acid, the total quantity of acid used being just sufficient for neutralization. In this manner the tetrahydrospiramycin A becomes concentrated in the middle portions, whereas in the first portions more strongly basic by-products and in the final portions the more weakly basic by-products accumulate.

The reaction product may also be purified by chromatography, for which purpose there may be used, for example, adsorption media such as aluminum oxide, silica gel or magnesium silicate. Especially suitable is distribution chromatography over cellulose columns which are impregnated with buffers of a pH-value between 3.5 and 7. As elution agents there are suitable for this purpose, for example, aliphatic ketones immiscible with water and saturated with buffer solution, such as methyl ethyl ketone or diethyl ketone.

The course of the reaction and also of the isolation of tetrahydrospiramycin A can be observed by paper chromatography.

The purified tetrahydrospiramycin A may be crystallized from an organic and/or aqueous-organic solvent, especially a mixture of an aromatic hydrocarbon, such as benzene or toluene, with a lower aliphatic hydrocarbon, such as hexane or petroleum ether, or a mixture of aliphatic ethers, such as diethyl ether, with an aliphatic hydrocarbon, or aqueous acetone.

The following examples illustrate the invention:

EXAMPLE 1

Hydrolysis of tetrahydrospiramycin B 4.66 grams (5 millimols) of tetrahydrospiramycin B, which has been obtained from spiramycin B by the method described in Example 4, are dissolved in 45 ml. of a mixture of methanol and water (1:1), and 5 ml. of a 1N-solution of caustic soda are added so that an initial concentration of alkali of about 0.1 normal is produced. The solution is allowed to stand for 24 hours at 20–25° C. with the exclusion of light and air. At the end of this period the solution is no longer alkaline to phenolphthalein or is at most weakly alkaline thereto. The solution is diluted with water to twice its volume, and then extracted three times with five times its volume of ether. The etheral extract is washed with a small amount of water and a saturated aqueous solution of sodium chloride, dried over sodium sulfate, and evaporated in vacuo, whereby a colorless pulverulent residue is obtained in a yield of 80–85%. As found by paper chromatography this material consists of tetrahydrospiramycin A (Rf-value equals 0.17) and a small amount of starting material (Rf-value equals 0.32) and of more weakly basic by-products (Rf-value greater than 0.55). In order to detect the spiramycins and tetrahydrospiramycins in the paper chromatography there is used Whatman No. 1 paper impregnated with a 0.2-molar citrate buffer having a pH value of 5.3. As the mobile phase is used methyl ethyl ketone saturated with the same buffer solvent. The position of the spots of substance is rendered visible by spraying with phosphoric acid of 15% strength and heating for a short time at 100° C. In order to obtain a pure product the crude hydrolysis product is distributed in a Craig distribution apparatus between chloroform and an 0.2-molar citrate buffer solution having a pH value of 5.0 with phases of equal volume. A 4% solution of the crude product in the lower phase is introduced into the first five units of the apparatus. After 100 transfers fractions 40–55, which according to the paper chromatogram contain pure tetrahydrospiramycin A, are combined. By the addition of caustic soda solution the base is forced out of the buffer solution into the chloroform phase. The chloroform solution is washed with water and saturated sodium chloride solution, dried over sodium sulfate, and evaporated to dryness in vacuo. The colorless residue is crystallized from a mixture of toluene and hexane in the form of prismatic crystals. For the purpose of anlysis the product is recrystallized twice from a mixture of ether and hexane and dried at 70° C. under 0.05 mm. pressure for 4 hours over phosphorus pentoxide. It melts at 108–112° C. (sinters at 104° C.), and has the specific rotation $[\alpha]^{24}_D = -68$ (c=0.99; chloroform). The ultra-violet spectrum (ethanol): weak adsorption in the form of a wide band at about 280 m$\mu$ ($\epsilon$=20) and end absorption towards 210 m$\mu$.

Infra-red spectrum (Nujol): Strong bands at 2.90, 5.80, 7.88, 8.68, 8.95, 9.40, 9.55, 9.88, 10.10, 11.10, 11.90, 12.40, 12.80, 13.90 $\mu$.

Analysis.—C, 61.45%; H, 9.43%; N, 3.54%; (O)CH$_3$, 1.76%.

Rf-value in the system stated: 0.17. As compared with this spiramycin A in the same system has an Rf-value of 0.11. Color reactions: By the method of Fischbach and Levine tetrahydrospiramycin A gives a similar, but slightly less intense, violet-red color reaction than spiramycin (see Helvetica Chimica Acta, vol. 39, page 317 [1956]).

In its physical, chemical and biological properties the product is identical with tetrahydrospiramycin A, which is obtained by the direct catalytic hydrogenation of spiramycin A.

Tetrahydrospiramycin A has a high antibiotic activity against test organisms in vitro, as shown in the following table. As test methods there were used series of dilutions (to the power of 10) in glucose broth, which was incubated for 24 hours at 37° C.

| Test organism | Inhibiting concentration, γ/ml. |
|---|---|
| Streptococcus mitis | 0.1 |
| Streptococcus pyogenes | 1 |
| Streptococcus faecalis | 100 |
| Micrococcus pyogenes var. aureus | 100 |
| Micrococcus pyogenes var. aureus (penicillin resistant) | 10 |
| Corynebacterium diphtheriae | 0.1 |
| Bacillus megatherium | 1 |

EXAMPLE 2

Hydrolysis of tetrahydrospiramycin C 1 mol of tetrahydrospiramycin C, obtained by the hydrogenation of spiramycin C by the process described in Example 4 (assumed molecular weight 949), is reacted in a mixture of methanol and water (1:1) with 1 mol of sodium hydroxide. The reaction, working up, purification and crystallization are carried out as prescribed in Example 1. The product so obtained is identical in its physical, chemical and biological properties with the tetrahydrospiramycin A described in Example 1.

EXAMPLE 3

Hydrolysis of a mixture of tetrahydrospiramycin B and C

An artificial mixture of pure tetrahydrospiramycin B and C in the ratio 1:1 is reacted in the manner described in Example 1 in a mixture of methanol and water (1:1) with 1 mol of caustic soda solution per mol of mixture of bases. The mixture of bases was assumed to have a mean molecular weight of 940. The working up, purification and crystallization are carried out in the manner described in Example 1. Pure crystalline tetrahydrospiramycin A is obtained.

EXAMPLE 4

Hydrogenation and hydrolysis of a mixture of spiramycin A, B, C, and D

A crude mixture of spiramycin A, B, C and D, obtained from a culture filtrate of Streptomyces A 8703 or A 9427 as described in the afore-mentioned patent application is hydrogenated in an alcoholic solution of 2% strength with a palladium-calcium carbonate catalyst of 10% strength until the absorption of hydrogen ceases. The mixture of tetrahydrospiramycins obtained after removing the catalyst and evaporating the alcohol, is reacted in methanol of 50% strength by the method described in Example 1 with sodium hydroxide. The quantity of caustic soda solution to be used depends on the content of tetrahydrospiramycin B, C and D in the mixture, so that one mol of sodium hydroxide reacts per mol of tetrahydrospiramycin B or C or D. The relative proportions of the four tetrahydro-bases are determined by paper chromatography. When the reaction is complete, the product is obtained by extraction with ether as described in Example 1. It contains, in addition to the desired tetrahydrospiramycin A, weaker basic (Rf-value greater than 0.18) and stronger basic (Rf-value<0.16) by-products. A far-reaching separation of these substances is carried out by fractional neutralization: the crude tetrahydrospiramycin A is dissolved in ethyl acetate to a solution of 10% strength and extracted by agitation with seven equal portions of a dilute aqueous solution of hydrochloric acid. The strength of the acid is so chosen that the total quantity is just sufficient to neutralize the mixture of bases. The individual acid extracts are adjusted to a pH value of 9 with saturated sodium carbonate solution and extracted by ether. The first two extracts and the last two extracts contain preponderantly the more strongly basic and more weakly basic by-products, respectively, whereas the three middle extracts contain tetrahydrospiramycin A in a largely purified state, which crystallizes out after concentrating the etheral solution and adding hexane thereto. From the first fractions and the last fractions further crystalline tetrahydrospiramycin A can be obtained by countercurrent distribution in the manner prescribed in Example 1.

What is claimed is:

1. Process for the manufacture of a hydrogenated antibiotic in unitary form named tetrahydrospiramycin A and salts thereof, wherein a member selected from the group consisting of tetrahydrospiramycin B, tetrahydrospiramycin C and tetrahydrospiramycin D and a mixture of any of tetrahydrospiramycins A, B, C and D is hydrolysed with at most 1.3 equivalents of a basic agent.

2. Process according to claim 1, wherein the resulting tetrahydrospiramycin A is treated with an acid to form an acid addition salt thereof.

3. Process as claimed in claim 1, wherein per mol of the tetrahydro compound one equivalent of a basic agent is used.

4. Process as claimed in claim 1, wherein the hydrogenation product of the mixture of crude bases obtained by the production of the spiramycins by fermentation is used as starting material.

5. Process as claimed in claim 1, wherein the hydrolysis is carried out in aqueous solution.

6. Process as claimed in claim 1, wherein the hydrolysis is carried out in a mixture of water and an organic solvent.

7. Process as claimed in claim 6, wherein the hydrolysis is carried out in a mixture of water and a lower alcohol.

8. Process as claimed in claim 1, wherein sodium hydroxide is used as basic agent.

9. Process as claimed in claim 1, wherein basic ion-exchangers are used as basic agent.

10. Process as claimed in claim 1, wherein the alkaline agent is added all at once.

11. Process as claimed in claim 1, wherein the alkaline agent is added in portions.

12. Process as claimed in claim 1, wherein the hydrolysis is carried out at a pH of at least 9.

13. Process as claimed in claim 1, wherein the reaction is carried out at room temperature.

References Cited in the file of this patent

UNITED STATES PATENTS 2,699,054    Conover _____ Jan. 11, 1955

FOREIGN PATENTS 758,726    Great Britain _____ Oct. 10, 1957
785,191    Great Britain _____ Oct. 23, 1957

OTHER REFERENCES

Antibiotics Annual, 1954–1955, pub. February 1955 by Med. Encycl. Inc., pp. 724–727.

Sigal et al.: J.A.C.S., 78:2, pp. 388–395; Jan. 20, 1956.

Hochstein: J.A.C.S., pp. 5080–5083, Oct. 20, 1954.

Flynn: J.A.C.S., pp. 3121–3131, June 20, 1954.